US011981382B2

(12) United States Patent
Fernández

(10) Patent No.: US 11,981,382 B2
(45) Date of Patent: May 14, 2024

(54) MOTORCYCLE LIFTING DEVICE AND METHOD

(71) Applicant: Ramón Gustavo Fernández, La Plata (AR)

(72) Inventor: Ramón Gustavo Fernández, La Plata (AR)

( * ) Notice: Subject to any disclaimer, the term of this patent is extended or adjusted under 35 U.S.C. 154(b) by 78 days.

(21) Appl. No.: 17/943,094

(22) Filed: Sep. 12, 2022

(65) Prior Publication Data

US 2023/0104512 A1    Apr. 6, 2023

Related U.S. Application Data

(60) Provisional application No. 63/252,776, filed on Oct. 6, 2021.

(51) Int. Cl.
| | |
|---|---|
| *B62H 1/06* | (2006.01) |
| *F16M 11/04* | (2006.01) |
| *F16M 11/24* | (2006.01) |

(52) U.S. Cl.
CPC ......... *B62H 1/06* (2013.01); *B62H 2700/005* (2013.01); *F16M 11/04* (2013.01); *F16M 11/24* (2013.01); *F16M 2200/08* (2013.01)

(58) Field of Classification Search
CPC .... B62H 1/06; B62H 2700/005; F16M 11/04; F16M 11/24; F16M 2200/08
See application file for complete search history.

(56) References Cited

U.S. PATENT DOCUMENTS

| | | | | |
|---|---|---|---|---|
| 4,180,253 A | * | 12/1979 | Ivers ...................... | B66F 15/00 269/296 |
| 4,193,582 A | * | 3/1980 | Neilsen ................... | B66F 15/00 254/131 |
| 4,348,010 A | * | 9/1982 | Baxter .................... | B66F 15/00 254/131 |
| 4,377,295 A | * | 3/1983 | Lemman ................. | B62H 1/02 280/295 |
| 4,580,804 A | * | 4/1986 | Weber ..................... | B62H 1/02 280/304 |
| 4,723,756 A | * | 2/1988 | Stumpf, Jr. ............ | F16M 11/18 254/93 H |
| 5,211,376 A | * | 5/1993 | Anderson ............ | B25H 1/0014 254/134 |
| 5,806,837 A | * | 9/1998 | Cargill .................... | B66D 1/04 254/133 R |

(Continued)

*Primary Examiner* — Monica E Millner
(74) *Attorney, Agent, or Firm* — Mariana I. Vernieri

(57) ABSTRACT

A foldable device for lifting a motorcycle that has fallen on its side has a bipod with two supports, a telescopic elongated main body, a handle, a ratchet strap coupled to a lever, a main strap having a closed loop in one end, and two secondary straps. The unfolded device is positioned firmly held to the floor besides the fallen motorcycle, centered between the gasoline tank and the seat, with the handle pointing up and the ratchet facing the motorcycle. The main strap passes below the motorcycle, so its closed loop end is wrapped to the motorcycle's foot peg and its open end is introduced into the ratchet. The lever is activated as many times as necessary until the wheels touch the floor, the secondary straps pass through the wheels attaching both ends to the bipod supports and the lever is activated again until the motorcycle is lifted.

1 Claim, 3 Drawing Sheets

(56) References Cited

U.S. PATENT DOCUMENTS

| | | | | |
|---|---|---|---|---|
| 5,967,732 | A * | 10/1999 | Floyd | B66F 3/00 |
| | | | | 254/8 R |
| 6,073,915 | A * | 6/2000 | Taylor | B66F 3/12 |
| | | | | 254/89 R |
| 6,341,763 | B1 * | 1/2002 | Lefebvre | B66F 15/00 |
| | | | | 254/131 |
| 6,494,423 | B1 * | 12/2002 | Ruth | B62H 1/02 |
| | | | | 248/188.8 |
| 6,705,596 | B2 * | 3/2004 | Reinikka | B66F 3/36 |
| | | | | 254/133 R |
| 6,802,493 | B2 * | 10/2004 | Lance | B66F 3/005 |
| | | | | 254/8 B |
| 7,007,964 | B2 * | 3/2006 | Lewoczko | B66F 1/00 |
| | | | | 254/237 |
| 7,182,361 | B2 * | 2/2007 | Lewoczko | B66F 1/00 |
| | | | | 254/131 |
| 10,604,123 | B2 * | 3/2020 | Huang | B25H 1/0014 |
| 2002/0130487 | A1 * | 9/2002 | Berkmann | B62H 1/04 |
| | | | | 280/303 |
| 2009/0108244 | A1 * | 4/2009 | Reidling | B66F 15/00 |
| | | | | 254/131 |
| 2016/0145083 | A1 * | 5/2016 | Louw | B66F 1/00 |
| | | | | 254/352 |

\* cited by examiner

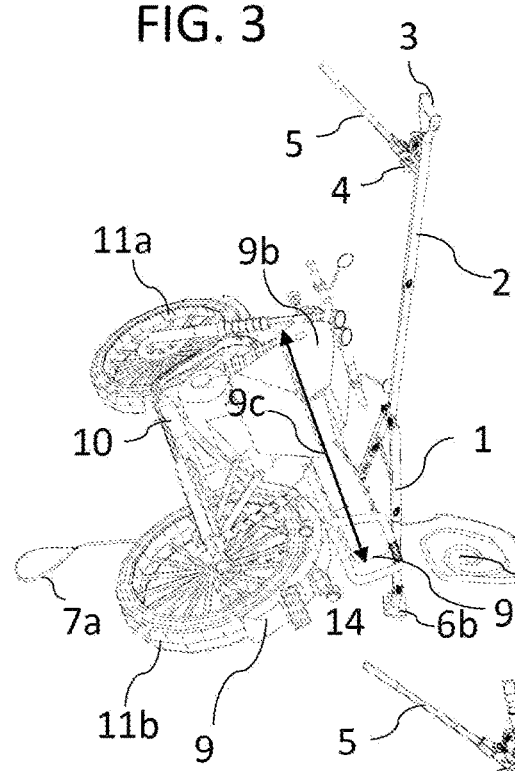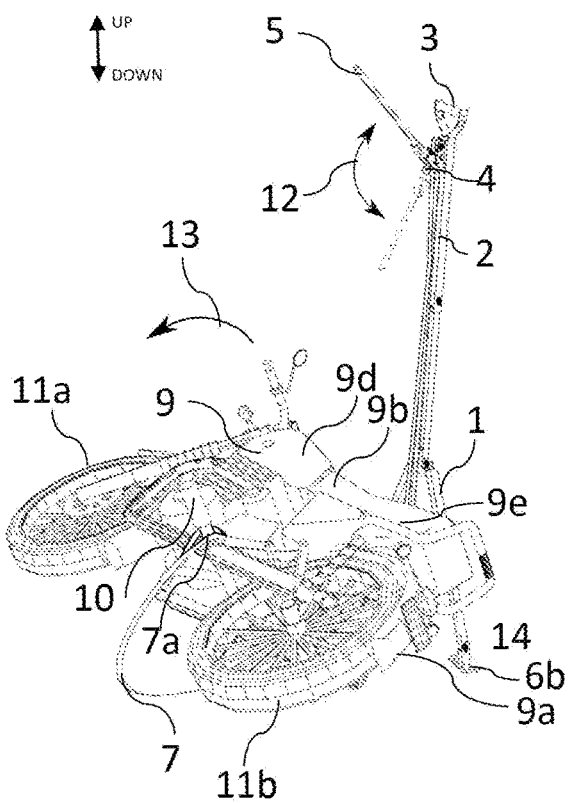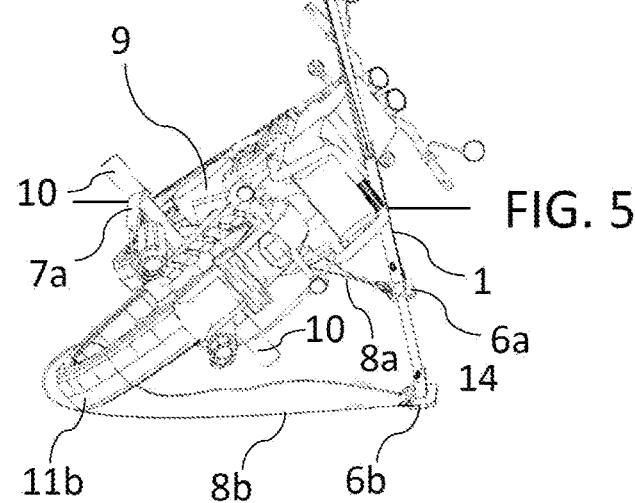

MOTORCYCLE LIFTING DEVICE AND METHOD

CROSS-REFERENCE TO RELATED APPLICATION

This application claims the benefit of U.S. Provisional Patent Application No. 63/252,776, filed Oct. 6, 2021, which is incorporated by reference herein in its entirety.

TECHNICAL FIELD

This invention relates generally to the field of motorcycles and, more particularly, the present invention relates to an apparatus and method to lift a motorcycle which has fallen to on its side to an upright position.

BACKGROUND OF THE INVENTION

While off-road motorcycles are usually light enough to be lifted by hand without need of external help when they fall on their side, and street motorcycles have less tendency to fall due to their habitual use on paved roads only, dual purpose motorcycles, which are designed to perform both on and off-road, have a high rate of falls while being heavy-weight, posing the problem of how to lift them when they fall. These motorcycles tend to fall very often due to the terrain where they circulate, in the mountains, sand, mud, ice, and other irregular terrains in which the motorcycle is difficult to handle. For this reason, the motorcycles are forced to travel at a low speed, which limits their stability, often causing the riders to lose their balance and fall on one side, especially when it is a heavy motorcycle, due to the weight of the motorcycle itself plus the weight of the load it carries. It is very normal for motorcycles under these conditions to fall. That is why is it usual for them to have crash bungs, fold-up levers, Carbon-fiber frame guards, and other types of protections against breakage on the sides of the motorcycles, which often come included in the models with more tendency to fall.

Because of the heavy weights of these motorcycles, it is generally very difficult for one individual human being to lift them. Today, lifting the motorcycle involves a physical effort proportional to the weight of the motorcycle, and on some types of motorcycles the required effort is too much at times and makes the task unachievable. That is the case of trail or maxitrail motorcycles and other kinds of dual-purpose motorcycles, but it is also a problem that can appear in any types of motorcycles that are heavy enough to make it impossible or strongly uncomfortable for their owners to lift them without help. To solve this problem, at least two people are needed and often it is necessary for the motorcycle rider to call for roadside assistance to get the motorcycle lifted back into its vertical position. This inconvenience is significant for motorcycle riders since many times this is a very decisive issue, to the point of being a determinant factor when considering whether or not they could carry out this activity, or type of trip or even for the decision of buying a motorcycle for this purpose or not, or what model of motorcycle to acquire. If they know that they will not be able to lift it in the very likely case it falls, they conclude that they cannot afford to purchase it regardless of the cost of the motorcycle.

Prior attempts of providing aids to fix this issue have failed by either being too bulky, expensive, dangerous, or unfit to be comfortably carried on the motorcycle itself. A device for lifting a fallen motorcycle by using a bipod that rests firmly on the floor, and a manually-activated lever connected to a ratchet strap tied to the motorcycle's foot peg by means of a main strap, and which aided by two secondary straps connecting each of the wheels of the motorcycle to each of the bipod legs to secure the bipod legs in place and prevent them from dislodging from their support points, exerts tension with enough force to lift the motorcycle, constituting an inexpensive and practical solution to a long felt unresolved need and advancing the field. Even more so if that device can be folded and conveniently stored at and carried in the motorcycle itself.

SUMMARY OF THE INVENTION

The main object of the present invention is to provide device for lifting a motorcycle that has fallen on its side and a method of lifting the same by using such device.

A Motorcycle Lifting Device created in accordance with the present invention is achieved by combining some or all of the following aspects:
  a) A foldable bipod having two legs and two supports, each support flexibly attached at the end of each of the legs, and each support having anti-slip mechanisms to firmly hold them to the floor.
  b)
  c) Flexibly attached to said bipod, an elongated main body that can be shortened and extended by telescopic extension, and that has a handle at its upper end, appropriate in size, shape, position, and height, for being comfortably grabbed by a human hand when the supports of the bipod are laying on the floor, with both the bipod and the main body in their unfolded/elongated positions.
  d)
  e) A ratchet strap's ratchet modified so that it can be coupled to a lever, and so that it can hold and screw-in at least two meters of a strap capable of lifting the weight of the motorcycle to be lifted.
  f) A main strap with a length of at least two meters and a thickness of at least forty millimeters and made of a material strong enough to lift at least two tons of weight and adequate in shape and size to be effectively introduced into to the ratchet of point (c), the main strap having an open end and a closed loop on the other end.
  g) Two secondary straps that can be attached by fasteners to holes in the supports of the bipod, these secondary straps measuring at least two meters in length, made of a material strong enough to lift at least one hundred and eighty kilograms of weight, and having a length adjustment mechanism.
  h) A lever attached to the ratchet so that the mechanism of the ratchet strap can be activated by manually operating this lever in an up-and-down motion, generating leverage effect to magnify the traction power of the force applied.

When both the bipod and the main body are in their folded/shortened positions, the device has a compacted shape and size suitable for being transported in the motorcycle itself.

A method for lifting a motorcycle that has fallen on its side with the aid of this device is also disclosed, comprising the steps of:
  (1) Positioning the unfolded device besides the fallen motorcycle that needs to be lifted, with the bipod's supports firmly held to the floor, parallelly to the length of the motorcycle, and placed so that it is centered between the gasoline tank and the motorcycle seat, with the elongated main body pointing up, and with the ratchet strap facing the motorcycle.

(2) Passing the main strap below the fallen motorcycle so that the closed loop end is on the side of the motorcycle opposite to the device and the open end is on the same side of the motorcycle as the device.

(3) Adjusting the closed loop end of the main strap to the motorcycle's foot peg on the side of the motorcycle opposite to the device and introducing the open end of main strap into the ratchet.

(4) With one hand on the handle and the other hand on the lever, manually activating the lever up and down as many times as necessary until the wheels of the motorcycle touch the floor.

(5) Passing the first secondary strap through the front wheel of the motorcycle and, wrapping the wheel, attaching both ends of the strap to the first bipod support and adjusting the length of the strap until it is slightly tense, and passing the second secondary strap through the rear wheel of the motorcycle and, wrapping the wheel, attaching both ends of the strap to the second bipod support and adjusting the length of the strap until it is slightly tense.

(6) With one hand on the handle and the other hand on the lever, manually activating the lever up and down as many times as necessary until the motorcycle achieves the desired vertical position.

BRIEF DESCRIPTION OF THE DRAWINGS

FIG. 3 is a schematic illustration of an embodiment of a Motorcycle Lifting Device in accordance with the present invention being positioned next to a fallen motorcycle in order to lift it, with the main strap unattached from the foot peg and from the strap.

FIG. 4 is a schematic illustration of an embodiment of a Motorcycle Lifting Device in accordance with the present invention being positioned next to a fallen motorcycle in order to lift it, with the main strap attached to the foot peg and the ratchet strap and illustrating the lever mechanism.

FIG. 5 is a schematic illustration of an embodiment of a Motorcycle Lifting Device in accordance with the present invention being positioned next to a fallen motorcycle in the process of lifting it, with the secondary straps wrapping the wheels of the motorcycle and attached to the bipod's supports.

DETAILED DESCRIPTION AND BEST MODE OF IMPLEMENTATION

Figure 1:
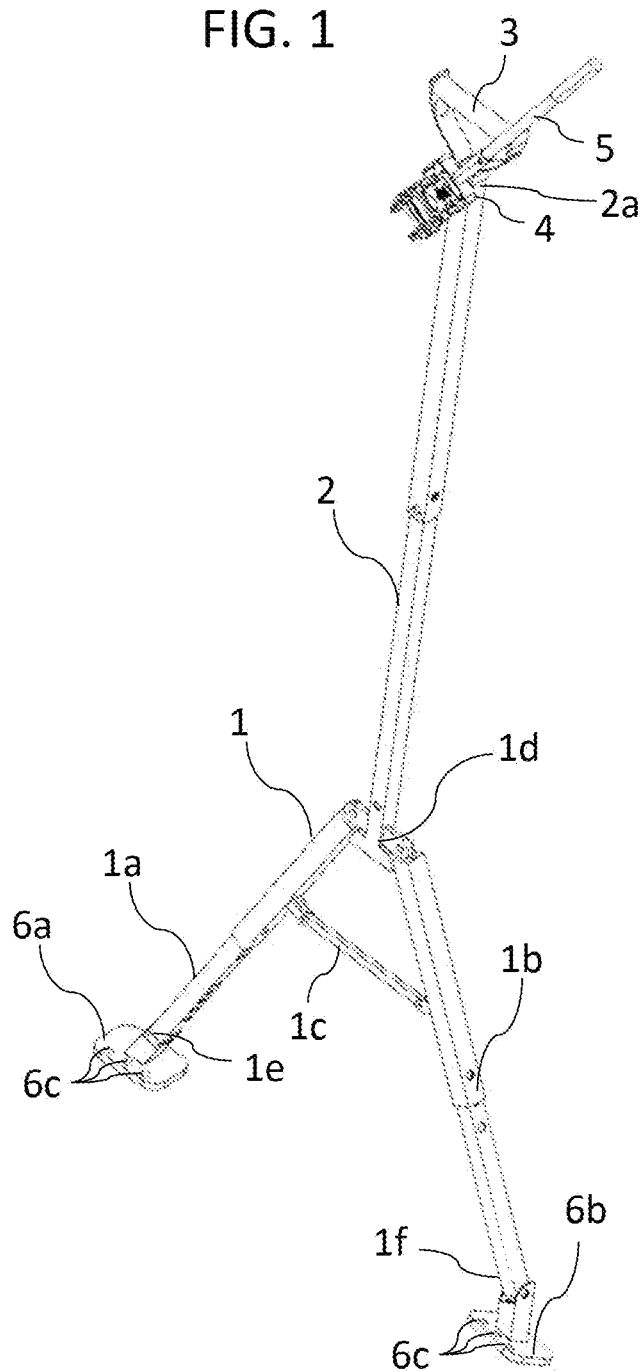
FIG. 1 is a perspective view of an embodiment of a Motorcycle Lifting Device in accordance with the present invention, in its unfolded position.

Disclosed is a Motorcycle Lifting Device and corresponding method for lifting a motorcycle which has fallen on its side with the use of such device.

As used in this specification and the appended claims, the term "flexibly attached" means attached in such a way that it allows free movement of the parts with respect of one another, rotating clockwise and anti-clockwise in every possible direction.

Some general aspects of the present invention have been summarized so far in the previous sections of this disclosure. Hereinafter, a detailed description of the invention as illustrated in the drawings will be provided. While some aspects of the invention will be described in connection with these drawings, it is to be understood that the disclosed embodiments are merely illustrative of the invention, which may be embodied in various forms. The specific materials, methods, structures and functional details disclosed herein are not to be interpreted as limiting. Instead, the intended function of this disclosure is to exemplify some of the ways—including the presently preferred ways—in which the invention, as defined by the claims, can be enabled for a Person of Ordinary Skill in the Art. Therefore, the intent of the present disclosure is to cover all variations encompassed within the spirit and scope of the invention as defined by the appended claims, and any reasonable equivalents thereof.

Referring to the drawings in more detail, FIG. 1 illustrates an embodiment of a Motorcycle Lifting Device having a bipod 1, which is the base for supporting the device to the floor. The bipod 1 has two legs 1a and 1b, and at the lower end of each of those legs (1f and 1g) it has a support 6a and 6b respectively, meant for holding the device firmly into the ground. These supports can have different shapes, sizes, and adaptations for each type of terrain. For example, they can include screws, holes, and removable cribs to be screwed or staked into earth or sand, and include anti-slip surfaces, such as rubber, for their use on hard floors like pavement, rock, or cement. In one embodiment, to make these supports 6a and 6b, two flat oval-shaped plates are cut. For this, a template is placed, marked, and cut with a hand grinder with a cutting disc. Each of these supports 6a and 6b have at least two holes 6c which can be made with a drill and an iron bit, with the objective of serving as the anchoring points of the secondary straps through fasteners that can be introduced through those holes. In other embodiments, other fastening means are provided, for example hoops or hooks. In the upper part of supports 6a and 6b, means are provided to flexibly attach these supports to the bipod's legs 1a and 1b respectively, in a way that allows for the relative rotation of the pieces. In an embodiment, for example, this is achieved by screwing or welding a piece of square tube rotated and diagonally drilled, that acts as the joint where it is linked with the bipod legs 1a and 1b.

The legs 1a and 1b consist of two telescopic parts or two pipes of different sizes, one circulates on the inside of the other, and it can be done by cutting two pipes of different sizes, which can also be cut with a grinder. At one end of the pipe that circulates inside the other, two through holes are made where a through screw that links the leg with the base joint can be introduced. These holes provide height adjustment for the legs, by allowing the linkage through screws or bolts to another through hole included near one of the ends of the outer pipe, so that each leg can be adjusted separately in height. To keep the distance between the leg 1a and the leg a2 and solidify the structure, a structural support member 1c is placed. For this, in the illustrated embodiment, halfway between the height adjustment and the upper part of the legs, two pierced ears are welded where a through screw is placed that keeps in place the structural support member 1c that holds the legs together. This structural support member 1c can be an elongated piece of plate with a hole at each end, which are made with a drill and a wick for iron.

The bipod tip 1d provides support to unite leg 1a to leg 1b through flexible attachment, and these to the elongated main body 2. Above the plate that links the legs 1a and 1b to the tip 1d of the bipod, a through hole is made, and it works as a folding position for the upper part of the bipod. Similarly, in the upper part of the elongated main body 2, another through hole is made. These two through holes have to coincide with the hole to be made in the larger section pipe that results in the last pipe of the bipod in such a way that there are two positions, one for work (unfolded position) and the other for folding by means of a screw or bolt (unfolded position, illustrated in FIG. 2.)

The elongated main body 2 is also telescopic. In this embodiment, it is formed by an inner pipe of smaller section than an outer pipe and which can be entirely inserted inside of it. On the pipe of smaller section two cuts are made at the tip of the pipe, so that a plate with two holes can be placed, which are the ones that by means of two screws link the legs with the bipod tip 1d. The cuts can be made with a grinder and cutting disc, and the holes with a drill and an iron wick. Under the plate placed, a piece of pipe of the same transverse diameter is welded, working as a stabilizer of the bipod 1, preventing movements to the sides. Near the base of the larger section square pipe, a through hole aligns with the other two at the base of the smaller section square pipe. At the other end of the pipe, a nut will be welded that will support the weight when lifting the motorcycle by linking the bipod and the ratchet 4, and finally a handle 3 is manufactured. In the illustrated example, two flat plates are cut, the which are welded to a round pipe, after that the handle is welded to the square pipe at the upper end 2a of the elongated body 2, but any handle adequate for a human hand would accommodate the function. The ratchet 4 can be a commercially available model of ratchet strap or one specifically manufactured for this use. Most commercially available ratchet straps would need modifications in order to be applied for this use. To modify it, it is necessary to improve the strength of the mechanism by removing the original ratcheting handle of the ratchet 4 by pulling up the release catch, flipping the ratchet 4 fully open, and setting the open ratchet so that the spiked wheels (cogs) are facing upwards. The release catch, also known as the release lever, is a smaller handle that disengages the ratcheting handle, located in the center of the top movable piece of the ratchet. The next step consists of cutting the ratcheting handle with a grinder having a cutting disc, then the arms of the ratcheting handle will be free, and they will have to be bent inwards to be welded to a piece of round pipe that will be the base of the lever 5 that operates the mechanism. This piece of round pipe is also welded to a crossbar in the ratchet 4. Then, the ratchet 4 has some moving parts and a fixed part. The slot at the bottom of the ratchet 4, known as the "mandrel" holds the length of the strap. Replacing the original mandrel by a larger piece in the shape of a "u", would allow the reel to collect more of the strap, by enlarging the area where the strap is coiled, to allow enough space for the required length of strap. This cut can also be made with the cut-off disc grinder. The original strap, in case of a commercial ratchet strap so modified, must be replaced by a thinner and narrower one. Other embodiments include other ways of attaching the lever 5 to the moving part of the ratchet 4 without departing from the spirit and scope of the present invention.

Figure 2:
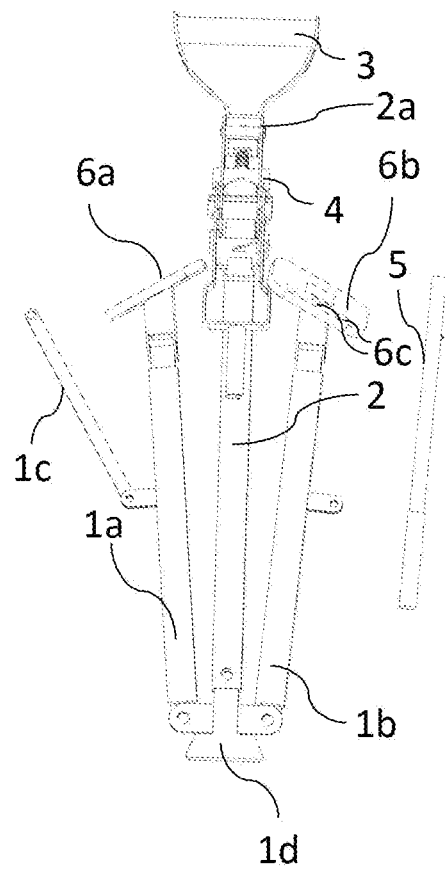
FIG. 2 is a front view of an embodiment of a Motorcycle Lifting Device in accordance with the present invention, in its folded position.

FIG. 2 shows the Motorcycle Lifting Device in its folded position. This position is ideal to comfortably carry the device in the motorcycle, reducing de space it occupies to make it less bulky and more portable than its unfolded position. To fold it, the structural support member 1c needs to be disconnected from one side, by removing the screw or bolt which connects it. The lever 5 is then detached from the ratchet 4. The elongated main body 2 is then telescopically compressed. The legs 1a and 1b are first telescopically compressed and then rotated upwards, in the direction of the handle 3. The straps, handle, fasteners and any other loose parts and helpful tools can be stored in a bag for greater transportability convenience.

FIGS. 3 to 6 show the steps for one possible method of lifting a fallen motorcycle in accordance with the present invention. For this illustrative method, FIG. 3 shows a motorcycle 9 fallen on its side so that, based on the position in which it has fallen, the side that points to the floor 14 is considered the lower side 9a of the motorcycle 9 and the side pointing up is considered the upper side 9b. The unfolded Motorcycle Lifting Device is positioned besides the fallen motorcycle 9 that needs to be lifted, with the bipod 1's supports 6a and 6b firmly held to the floor (only 6b is shown in this figure due to perspective but 6a is similarly placed on the other side). The bipod 1 is placed parallelly to the length 9c of the motorcycle and centered between the gasoline tank 9d and the motorcycle seat 9e, with the elongated main body 2 pointing up, and with the ratchet 4 facing the motorcycle. The lever 5 is attached to the ratchet 4's ratcheting handle. The main strap 7 is placed below the fallen motorcycle 9 so that the closed loop 7a is on the side of the motorcycle opposite to the device and the open end 7b is on the same side of the motorcycle as the device.

FIG. 4 shows the closed loop 7a of the main strap 7 wrapping the motorcycle's foot peg 10 on the side of the motorcycle 9 opposite to the device and the open end of main strap 7 already introduced into the ratchet 4. Once this is done, when the subject grabs with one hand the handle 3 and, with the other hand on the lever 5, he or she manually activates the lever 5 up and down as many times as necessary doing the movement indicated by the arrow of reference number 12, the main strap 7 will tighten by action of the ratchet 4, and the motorcycle 9 will begin to lift with the movement indicated by the arrow of reference number 13 until the wheels 11a and 11b of the motorcycle 9 touch the floor.

Figure 6:
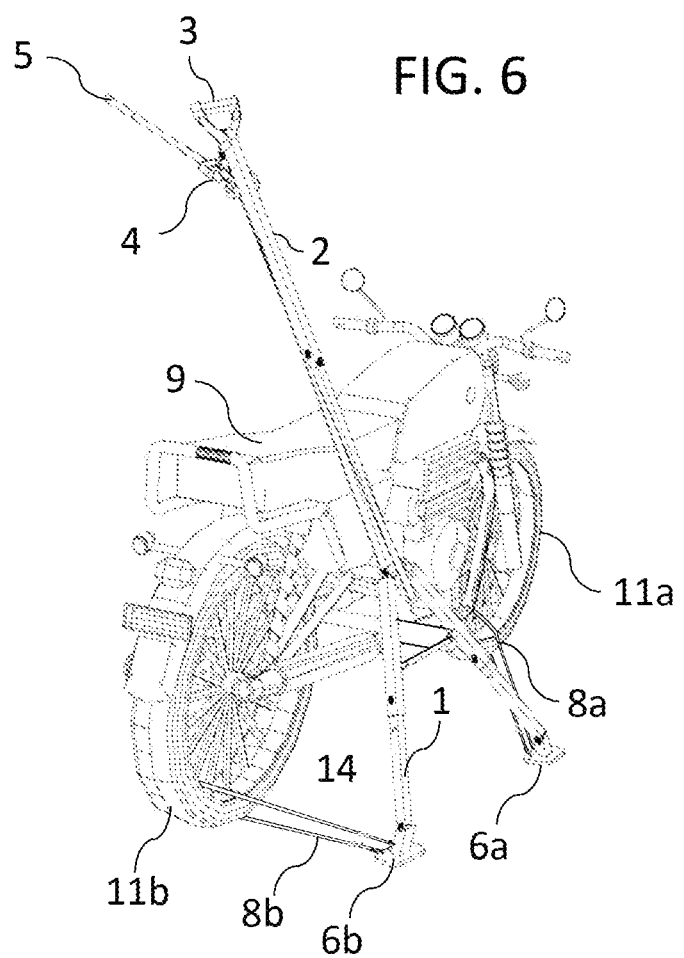
FIG. 6 is a schematic illustration of an embodiment of a Motorcycle Lifting Device in accordance with the present invention being positioned next to a motorcycle that has already been lifted, with the secondary straps wrapping the wheels of the motorcycle, attached to the bipod's supports and adjusted in length.

Once the wheels 11a and 11b of the motorcycle 9 are touching the floor, FIG. 5 shows how the first secondary strap 8a is passed through the front wheel 11a of the motorcycle 9. The figure also shows how, wrapping the front wheel 11a, both ends of the first secondary strap 8a are attached to the first bipod support 6a, and how the second secondary strap 8b is passed through the rear wheel 11b of the motorcycle 9 and, wrapping the rear wheel 11b, both ends of the second secondary strap 8b are attached to the second bipod support 6b. After this step, both secondary straps 8a and 8b need to be tightened by adjusting the length of the straps until they are slightly tense. Finally, FIG. 6 shows how, after manually activating the lever 5 up and down as many times as necessary with one hand on the handle 3 and the other hand on the lever 5, the motorcycle 9 has achieved the desired vertical position.

The description as set forth is not intended to be exhaustive or to limit the invention to the precise form disclosed. Many modifications and variations are possible in light of the teachings above without departing from the spirit and scope of the forthcoming claims.

The invention claimed is:
1. A method for lifting a motorcycle that has fallen to a floor, said motorcycle comprising an upper side, a lower side, a length, a gasoline tank, a foot peg, a front wheel, a rear wheel and a seat, said method comprising:

positioning a Motorcycle Lifting Device beside the upper side of the motorcycle, said Motorcycle Lifting Device comprising:
- a. a bipod having two legs, each of said legs having a lower end and a support flexibly attached at said lower end, said supports having holes;
- b. an elongated main body flexibly attached to said bipod, wherein said elongated main body is shortened and extended by telescopic extension, and wherein said elongated main body comprises an upper end and a handle at said upper end;
- c. a lever;
- d. a ratchet coupled to said lever, said ratchet holding and screwing-in a main strap, wherein said ratchet is activated by manually operating said lever in an up-and-down motion;
- e. a main strap having a length of at least two meters and a thickness of at least forty millimeters, said main strap having an open end and a closed loop on an opposite end; and
- f. two secondary straps attached by fasteners to said holes in the supports of the bipod, said secondary straps measuring at least two meters in length;

wherein the supports of the bipod are firmly held to the floor, parallelly to the length of the motorcycle, and placed so that said elongated main body is centered between the gasoline tank and the seat, with said elongated main body pointing up, and with said ratchet facing the motorcycle;

passing said main strap below the fallen motorcycle so that said closed loop end is in the lower side of the motorcycle and said open end is on the upper side of the motorcycle;

adjusting the closed loop end of the main strap to the motorcycle's foot peg on the lower side of the motorcycle and introducing the open end of the main strap into the ratchet;

with one hand on the handle and the other hand on the lever, manually activating the lever up and down until the wheels of the motorcycle touch the floor;

passing a first secondary strap through the front wheel of the motorcycle and, wrapping said front wheel, attaching both ends of the first secondary strap to a first bipod support and adjusting length of the first secondary strap until said first secondary strap is slightly tense, and passing a second secondary strap through the rear wheel of the motorcycle and, wrapping said rear wheel, attaching both ends of the second secondary strap to a second bipod support and adjusting length of the second secondary strap until said second secondary strap is slightly tense; and with one hand on the handle and the other hand on the lever, manually activating the lever up and down until the motorcycle achieves a vertical position.

\* \* \* \* \*